(12) United States Patent
Stiesdal

(10) Patent No.: US 8,011,893 B2
(45) Date of Patent: Sep. 6, 2011

(54) MODULE OF A NACELLE OF A WIND TURBINE, NACELLE OF A WIND TURBINE, WIND TURBINE AND METHOD FOR THE ASSEMBLY OF A NACELLE OF A WIND TURBINE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 534 days.

(21) Appl. No.: 12/291,185

(22) Filed: Nov. 6, 2008

(65) Prior Publication Data

US 2009/0129931 A1    May 21, 2009

Related U.S. Application Data

(60) Provisional application No. 60/989,467, filed on Nov. 21, 2007.

(30) Foreign Application Priority Data

Jan. 23, 2008 (EP) .................................. 08001259

(51) Int. Cl.
*F03D 11/04* (2006.01)
(52) U.S. Cl. ................................ 416/204 R; 416/244 R
(58) Field of Classification Search ............... 416/204 R, 416/205, 244 R, 245 R
See application file for complete search history.

(56) References Cited

U.S. PATENT DOCUMENTS 6,371,730 B1 * 4/2002 Wobben .................... 416/244 R
7,442,009 B2 * 10/2008 Arel ............................. 416/142

* cited by examiner

*Primary Examiner* — Chandra Chaudhari

(57) ABSTRACT

The invention concerns a module of a nacelle of a wind turbine, which is separately designed, manageable and comprise a housing part. The module is connectable to at least one further module of the nacelle, which is also separately designed, manageable and has a housing part, wherein the housing part of the module builds in the assembled status of the nacelle, which comprises several modules, a part of the housing of the nacelle. The invention concerns also a nacelle comprising several such modules, a wind turbine comprising such a nacelle as well as a method for the stepwise assembly of such a nacelle aloft.

20 Claims, 2 Drawing Sheets

MODULE OF A NACELLE OF A WIND TURBINE, NACELLE OF A WIND TURBINE, WIND TURBINE AND METHOD FOR THE ASSEMBLY OF A NACELLE OF A WIND TURBINE

CROSS REFERENCE TO RELATED APPLICATIONS

This application claims the benefits of European application No. 0881259.4 filed Jan. 23, 2008 and U.S. Provisional application 60/989,467 filed Nov. 21, 2007, both of the applications are incorporated by reference herein in their entirety.

FIELD OF INVENTION

The invention relates to a module of a nacelle of a wind turbine, a nacelle of a wind turbine, a wind turbine and a method for the assembly of a nacelle of a wind turbine.

BACKGROUND OF THE INVENTION

Wind power becomes more and more important. Parallel with the increasing significance of wind power wind turbines are getting larger and larger, which makes it more difficult to transport the large, in general preassembled and integrated wind turbine parts from the place of manufacture to the sites of erection, this can be onshore or offshore.

Normally a wind turbine comprises a few larger parts in form of the blades, the hub, the tower and the nacelle. Particularly the nacelle comprises a number of integrated main components such as a main shaft, a main bearing assembly, a gearbox, a generator, some power/control components, a transformer, a cooling system and so on, which are all arranged on a common bedplate and in a common nacelle housing. The bedplate has a yaw system to orient the nacelle towards the wind direction. Typically the nacelle is completely preassembled at the place of manufacture.

When a wind turbine is erected the blades, the hub, the tower and the preassembled nacelle are transported to the site of erection. The tower is erected, the nacelle is mounted on the tower, the hub is mounted on the nacelle and the blades are attached to the hub by means of at least one crane. Thereby not only the transportation in particular the transportation of the large and heavy nacelle is difficult, but also the mounting on the tower, which requires sufficient crane capacity to handle the complete nacelle weight.

Moreover the servicing of such a wind turbine is often very complicated and time consuming, in particular when one or more components of the nacelle have to be replaced.

SUMMARY OF INVENTION

It is therefore an object of the present invention to lay the foundations that the transportation and/or the assembly of at least a part of a wind turbine is facilitated. It is a further object of the invention to indicate a method for the assembly of a part of a wind turbine.

The first object is inventively achieved by a module of a nacelle of a wind turbine, which is separately designed, separately manageable and comprises a housing part, wherein the module is connectable to at least one further module of the nacelle, which is also separately designed, separately manageable and has a housing part, and wherein the housing part of the module builds in the assembled status of the nacelle, which comprises several modules, a part of the housing of the nacelle. Thus the invention pursues a modular concept or a modular design of a nacelle, wherein the single modules build in the assembled status substantially the nacelle and wherein preferably each module comprise at least one functional unit of a wind turbine, e.g. a generator, a transformer, a power unit, a control unit etc. Thereby the external housing part of the module forms a part of the external housing of the whole nacelle. Having the nacelle of a wind turbine divided into such separate modules it becomes possible to manufacture the modules at separate locations and to assemble the modules for forming a complete nacelle first during the installation of a wind turbine. This will facilitate not only the transportation of the modules, but also the specialization of manufacturing of certain modules at competence centres. Thereby a module is able to be transported or shipped completely, wherein in particular the housing part of the module provides mechanical and weather protection during transportation and storage of the module.

Moreover it becomes easier to carry out the installation of the nacelle with limited crane capacity, since the assembly may be carried out at height, installing one module at a time, in which case the crane requirements are determined not by the complete nacelle weight but by the weight of the heaviest module.

Furthermore in case of a failure of a complete module the respective module is able to be replaced.

In a variant of the invention the module comprises connection means for connecting the module to at least a further module. Preferably the connection means of the module comprises at least one flange for connecting the module to the further module. Thus when a second module is arranged on a first module the flange of the second module and the flange of the first module, which are arranged oppositely to each other, are able to be bolted together. In such a way the nacelle is built stepwise until all required modules are arranged.

According to a further variant of the invention the module comprises as functional unit a generator, a retaining arrangement, a cooling unit, a control unit, a transformer or a main-shaft-bearing arrangement. According to this variant of the invention there are different specialised modules in form of a generator module, a retaining arrangement module, a cooling module, a control module, a transformer module and a main-shaft-bearing arrangement module.

In an embodiment of the invention the module comprises a substantially explosion and/or a fire resistant wall. In particular the transformer module comprises such an explosion and/or fire resistant wall next to a further module. Preferably the transformer or power-unit module is arranged on the rear end of the nacelle and comprise the mentioned explosion and/or fire resistant wall to the afore positioned module. According to a further embodiment of the invention a module, preferably the transformer or power-unit module comprises a bursting disc on its free end. In case of an explosion or a fire, the bursting disc, possibly being a part of the outer shell of the transformer or the power-unit module, will distort or be blown out to minimise blast effects in the nacelle and to protect the other modules and any personnel in the nacelle. In that situation the transformer or the power unit module is able to be replaced without replacing any other component.

According to a further variant of the invention the module comprises at least one functional mechanical and/or functional electrical interface for connecting the module functionally to a further module. In that way the whole mechanical and electrical interconnection throughout the nacelle is able to be achieved.

According to another embodiment of the invention the module and the housing part of the module respectively is self-supporting. So each module is able to be arranged on another module without the need of any supporting means for a module.

The object of the invention is also achieved by a nacelle of a wind turbine comprising several separately designed, manageable and replaceable modules, wherein each module is connectable to at least one further module and has a housing part, wherein the modules build in the assembled status substantially the nacelle, and wherein the housing parts of the modules build at least partially the housing of the nacelle. Thereby all variants and advantages mentioned in relation with a single module apply also to the nacelle.

According to a further variant of the invention at least one module comprises a helihoist platform. In this way it is possible to get to the nacelle by helicopter even under bad weather conditions.

In an embodiment of the invention the nacelle comprises on its one end an end plate, which can be a bursting disc.

The object of the invention is also achieved by a wind turbine comprising at least one module as disclosed before and/or a nacelle as disclosed before.

The further object of the invention is achieved by a method for the assembly of a nacelle of a wind turbine as disclosed before, wherein modules as disclosed before are arranged in series on a wind turbine tower, wherein a module comprising a retaining arrangement or a main-shaft-bearing arrangement is arranged on the tower and at least one further module is arranged on the module comprising the retaining arrangement or the main-shaft-bearing arrangement. In this way the nacelle of a wind turbine is able to be assembled stepwise during the erection of the wind turbine on site with limited crane capacity. Thereby the modules are mounted one by one aloft.

BRIEF DESCRIPTION OF THE DRAWINGS

The invention will in the following be explained in more detail with reference to the schematic drawings, wherein.

DETAILED DESCRIPTION OF INVENTION

Figure 1:
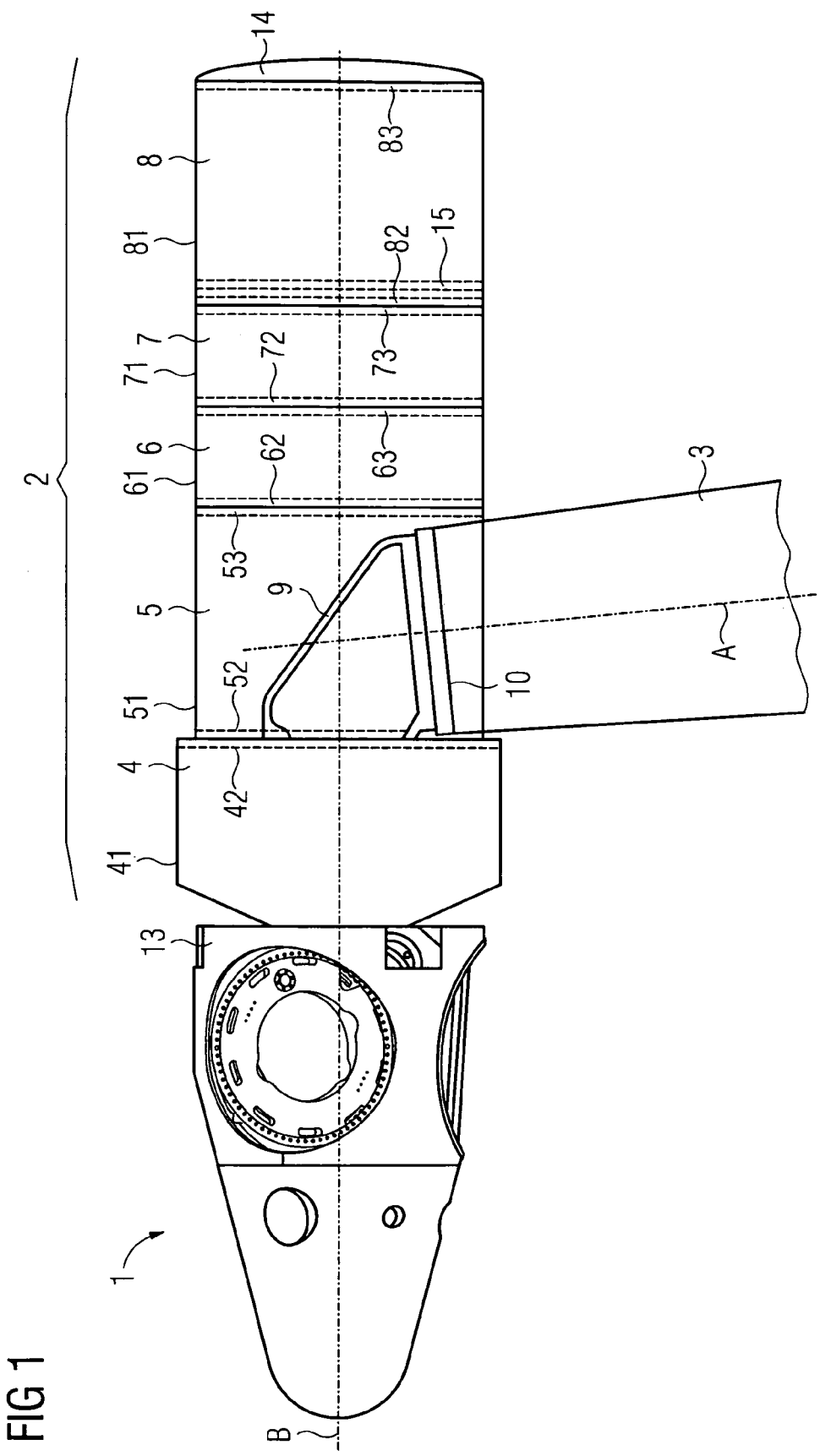
FIG. 1 shows a nacelle comprising several single functional modules arranged on a tower of a wind turbine and FIG. 2 shows another embodiment of a nacelle comprising several single functional modules.

FIG. 1 shows schematically a nacelle 2 according to the invention arranged on tower 3 of an only partly shown wind turbine 1. The nacelle 2 comprises several single, separately designed, separately manageable and separately replaceable modules 4-8 according to the invention.

In case of the present embodiment of the invention a module 5 comprising a retaining arrangement in form of a retaining arm 9 is arranged on the tower 3. More precisely the module 5 and the retaining arm 9 respectively is attached to a tower flange 10 and turnable around the axis A of the tower 3 by means of a not explicitly shown yaw system to orient the nacelle 2 towards the wind direction. The module 5 comprises a housing part 51. In case of the present embodiment of the invention the housing part 51 is self-supporting and comprises on the front end and the rear end connection means in form of flanges 52, 53.

A self-supporting module 4 comprising a generator and a housing part 41 with a connection flange 42 on the rear end of the housing part 41 is arranged on the front end of the module 5. Thereby the flange 42 of the housing part 41 and the flange 52 of the housing part 51 as well as a stationary part of the generator and the retaining arm 9 of the module 4 are bolted together.

A conventional hub 13 is attached to the module 4 and a rotary part of the generator respectively by means of bolts.

A self-supporting module 6, comprising a cooling unit and a housing part 61 is arranged on the rear end of the module 5. The housing part 61 of the module 6 comprises on the front end and the rear end connections means in form of flanges 62, 63. The flange 53 of the housing part 51 of the module 5 and the flange 62 of the housing part 61 of the module 6 are bolted together, so that the module 6 is attached to the module 5.

A further self-supporting module 7 comprising a control unit and a housing part 71 is arranged on the rear end of the module 6. The housing part 71 of the module 7 comprises on the front end and the rear end connections means in form of flanges 72, 73. The flange 63 of the housing part 61 of the module 6 and the flange 72 of the housing part 71 of the module 7 are bolted together, so that the module 7 is attached to the module 6.

A last self-supporting module 8 comprising a transformer and a housing part 81 is arranged on the rear end of the module 7. The housing part 81 of the module 8 comprises on the front end and the rear end connections means in form of flanges 82, 83. The flange 73 of the housing part 71 of the module 7 and the flange 82 of the housing part 81 of the module 8 are bolted together, so that the module 8 is attached to the module 7.

In case of the present embodiment of the invention the transformer module 8 comprises additionally a substantially explosion and/or fire resistant wall 15 on the front side next to the module 7.

An end cap or end plate 14 is attached to the rear end of the module 8. The end plate 14 closes the rear end of the module 8. Thereby the end plate 14 is bolted with the flange 83. In case of the present embodiment of the invention the endplate 14 is a bursting disc or a kind of bursting disc. Thus in case of explosion or fire in the transformer module 8 the bursting disc will distort or be blown out to minimise blast effects in the nacelle 2 and to protect the other functional modules 4-7 as well as any personal in the nacelle together with the explosion and/or fire resistant wall 15. Because the transformer module 8 is the last module of the nacelle 2 it can be replaced in such a situation without replacing any other module or component of the wind turbine 1.

If necessary also the other modules are able to have an explosion and/or fire resistant wall and/or a bursting disc.

As can be seen from FIG. 1 the single, separately designed, manageable and replaceable modules 4-8 are arranged in series in relation to a centre axis B on the tower 3 of the wind turbine 1 and build in the assembled status the nacelle 2 of the wind turbine 1. The housing parts of the single modules 4-8 are in such a way aligned to each other, that the single housing parts 41, 51, 61, 71 and 81 build together with the end plate 14 the housing or canopy of the nacelle 2. Thus there is no separate or additional housing surrounding the single modules 4-8 necessary. In fact the housing parts 41, 51, 61, 71, 81 and the end plate 14 are connected with each other water tight, e.g. by means of appropriate sealings.

All or some modules 4-8 can in a not shown manner comprise functional mechanical and/or functional electrical interfaces as wells as mechanical components and cables for mechanical and/or electrical interconnections of the modules 4-8. There is e.g. a not shown electrical interconnection comprising functional electrical interfaces and cables between the generator module 4 and the transformer module 8. Examples of functional mechanical interfaces of modules are the stationary part of the generator of the module 4 as a first functional mechanical interface and the retaining arm 9 of the module 5 as a second functional mechanical interface.

A flange of a housing part preferably runs along the perimeter of the housing part, wherein the housing part is able to have a ring-shaped cross section or a cross section having a different form.

The module 5 comprising the retaining arm 9, which can also be identified as a load-bearing module, is carrying the weight and the load of the hub 13, the not shown three rotor blades attached to the hub 13 and the modules 4-8, thereby transferring the load to the tower 3.

As disclosed each module 4-8 can be self-supporting, wherein the housing part of each module typically is the weight- and load-carrying component of the respective module 4-8.

As already mentioned, having the nacelle 2 of the wind turbine 1 divided into the single modules 4-8 it becomes possible to manufacture the single modules 4-8 at separate locations and to assemble the modules 4-8 for forming a complete nacelle 2 first during the installation of the wind turbine 1. This facilitates the transportation of the modules 4-8 to the site of erection as well as the specialization of manufacturing of certain modules at competence centres. Each module 4-8 is able to be transported or shipped completely, wherein in particular the housing part and an additional packaging of the module at both ends of the module provides mechanical and weather protection during transportation of the module.

Further on in case of a failure of a complete module the respective module is able to be replaced.

Figure 2:
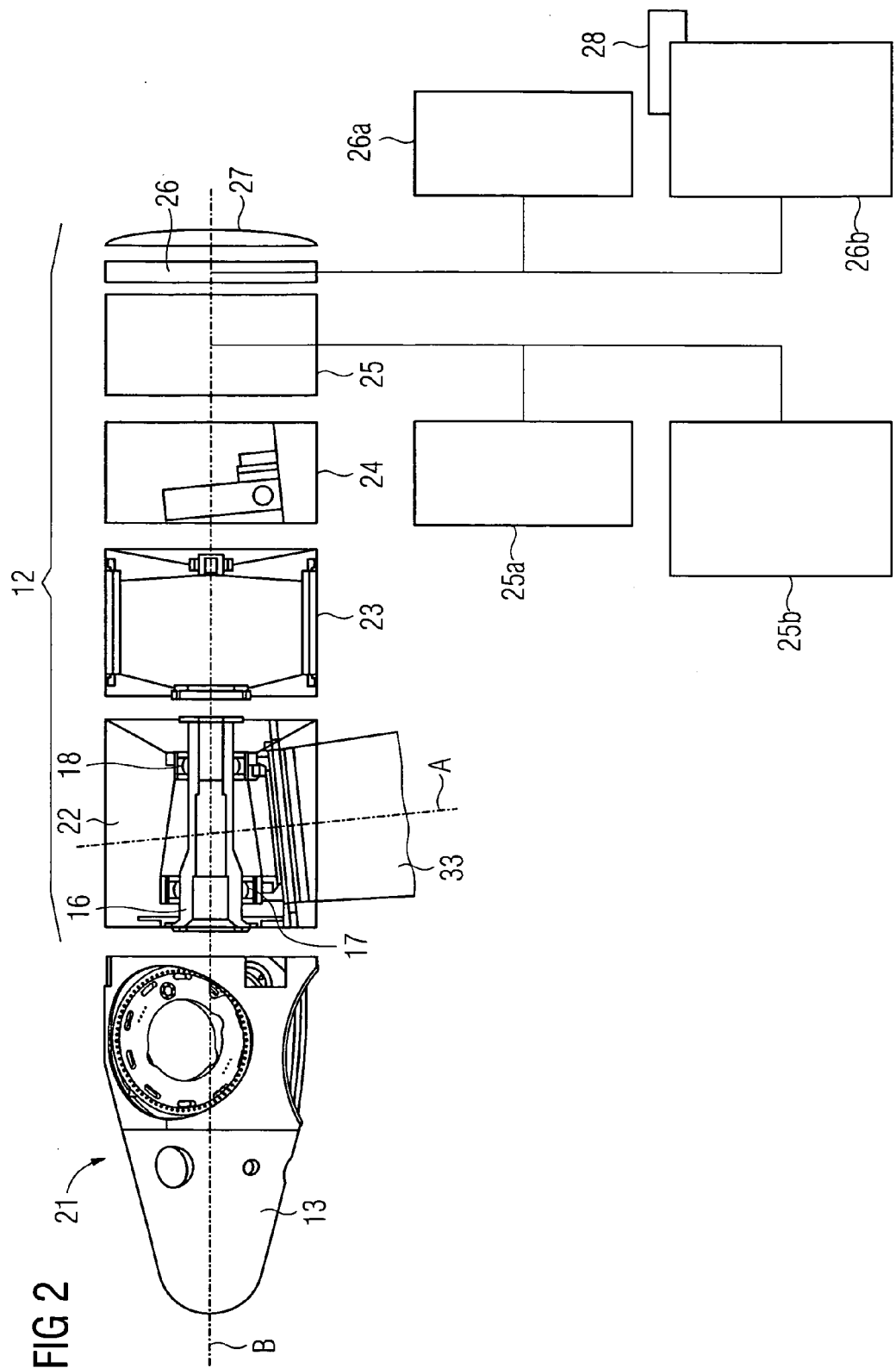

FIG. 2 shows another embodiment of a modularised nacelle 12 of a wind turbine 21 in an exploded view.

In case of this embodiment a module 22 comprising a main shaft bearing arrangement or a load bearing arrangement including a main shaft 16 and two main bearings 17, 18 is arranged on a schematically shown tower 33. A module 23 comprising a generator is arranged on the rear end of the module 22, wherein the rotor of the generator is connected to the pivotable main shaft of the main shaft bearing arrangement. A hub 13 is attached to the main shaft 16 of the module 22.

A module 24 comprising a control unit is arranged on the module 23, a module 25 comprising a cooling unit is arranged on the module 24 and a module 26 comprising a transformer is arranged on the module 25. The transformer module 26 is closed with an end plate 27.

As can be seen from FIG. 2 the nacelle 12 of a wind turbine can be modularised to such an extent that customised solutions are implemented simply by adding or deleting modules. The module 25 comprising a cooling unit can be e.g. an offshore cooling/climate control module 25*a* or a hot climate cooling module 25*b*. Also the transformer module 26 is available in different designs, e.g. as standard transformer module 26*a* or as transformer module 26*b* with helihoist platform 28. In the same way there can exist alternative designs concerning the other modules 22-24.

The connection of the modules 22-26 can be achieved as disclosed in the context with the embodiment of FIG. 1. The modules 22-26*b* have preferably substantially the same properties as the modules 4-8.

The invention claimed is:

1. A module of a nacelle of a wind turbine, comprising:
a housing part of the module where the module of the nacelle is separately designed, manageable and is connectable to at least one further module of the nacelle that is also separately designed, manageable and has a further housing part associated with the further module of the nacelle, wherein the housing part of the module builds in the assembled status of the nacelle, that comprises several modules, a part of the housing of the nacelle.

2. The module according to claim 1, further comprising a connection device that connects the module to at least a further module.

3. The module according to claim 2, wherein the connection device includes at least one flange for connecting the module to the further module.

4. The module according to claim 3, further comprising a generator, a retaining arrangement, a cooling unit, a control unit, a transformer or a main-shaft-bearing arrangement.

5. The module according to claim 4, further comprising a substantially explosion and/or a fire resistant wall.

6. The module according to claim 5, further comprising a bursting disc arranged at an end.

7. The module according to claim 6, further comprising at least one mechanical and/or electrical interface for connecting the module to a further module.

8. The module according to claim 7, wherein the module is self-supporting.

9. A nacelle of a wind turbine, comprising
a plurality of discrete modules,
wherein each module
is separately designed, manageable and replaceable,
is connectable to at least one further module of the plurality of modules, and
has a housing part associated with the respective module;
wherein the modules build in the assembled status substantially the nacelle, and
wherein the housing parts of the modules build at least partially the housing of the nacelle.

10. The nacelle according to claim 9, wherein the modules are arranged in series.

11. The nacelle according to claim 10, wherein at least one of the plurality of modules comprises a connection device that connects at least one module of the plurality of modules to at least a further module of the plurality of modules.

12. The nacelle according to claim 11, wherein the connection device comprises at least one flange that connects at least one module of the plurality of modules to at least one further module of the plurality of modules.

13. The nacelle according to claim 12, wherein at least one module comprises a generator, a retaining arrangement, cooling unit, a control unit, a transformer or a main-shaft-bearing arrangement.

14. The nacelle according to claim 13, wherein at least one module comprises a substantially explosion and/or a fire resistant wall.

15. The nacelle according to claim 14, wherein at least one module comprises a bursting disc arranged at an end.

16. The nacelle according to claim 15, wherein at least one module comprises at least one mechanical and/or electrical interface that connects the module to a further module.

17. The nacelle according to claim 16, wherein at least one module is self-supporting.

18. The nacelle according to claim 17, wherein at least one module comprises a helihoist platform.

19. The nacelle according to claim 18, further comprising an end plate arranged at one end.

20. A wind turbine, comprising
a tower that supports the turbine;
a rotatable hub arranged coaxially with a rotational centerline of the turbine;
a plurality of turbine blades attached to a rotor; and a nacelle attached to a flange of the rotor hub, the nacelle comprising a plurality of modules, where each module:
is separately designed, manageable and replaceable,
is connectable to at least one further module of the plurality of modules, and
has a housing part associated with the respective module, and
cumulatively forms the nacelle in an assembled state.

* * * * *